United States Patent [19]

Moore et al.

[11] Patent Number: 5,258,199
[45] Date of Patent: Nov. 2, 1993

[54] CHOCOLATE-FLAVORED CONFECTIONS AND METHOD FOR MANUFACTURING

[75] Inventors: Carl O. Moore, Rochester; James R. Dial, Moweaqua, both of Ill.

[73] Assignee: A. E. Staley Manufacturing Co., Decatur, Ill.

[21] Appl. No.: 752,347

[22] Filed: Aug. 30, 1991

[51] Int. Cl.$^5$ ................................................. A23G 3/00
[52] U.S. Cl. ..................................... 426/660; 426/631; 426/661
[58] Field of Search ............... 426/549, 660, 661, 658, 426/631, 804

[56] References Cited

U.S. PATENT DOCUMENTS

| | | | |
|---|---|---|---|
| 3,184,315 | 5/1965 | Wolf | 99/23 |
| 3,883,365 | 5/1975 | Forsberg et al. | 127/60 |
| 3,928,062 | 12/1975 | Yamauchi | 127/60 |
| 4,199,374 | 4/1980 | Dwivedi et al. | 127/60 |
| 4,344,969 | 8/1982 | Youngquist et al. | 426/18 |
| 4,455,333 | 6/1984 | Hong et al. | 426/94 |
| 4,465,702 | 8/1984 | Eastman | 426/578 |
| 4,503,080 | 3/1985 | Brabbs et al. | 426/94 |
| 4,517,021 | 5/1985 | Schollmeier | 127/30 |
| 4,643,773 | 2/1987 | Day | 127/30 |
| 4,704,293 | 11/1987 | Moore et al. | 426/573 |
| 4,707,365 | 11/1987 | Haynes et al. | 426/94 |
| 4,722,849 | 2/1988 | Dartey et al. | 426/94 |
| 4,732,767 | 3/1988 | Seiden et al. | 426/94 |
| 4,761,292 | 8/1988 | Augustine et al. | 426/321 |

FOREIGN PATENT DOCUMENTS 0204941 12/1986 European Pat. Off. .

OTHER PUBLICATIONS

B. W. Minifie, *Chocolate, Cocoa and Confectionery: Science and Technology*, pp. 28–141 (AVI Publ. Co., Westport, Conn., 1980, 2d ed.).
H. M. Pancoast et al., *Handbook of Sugars*, pp. 157–287 (AVI Publ. Co., Westport, Conn., 2d ed., 1980).
B. W. Minifie, *Chocolate, Cocoa and Confectionery: Science and Technology*, pp. 450–454 (AVI Publ. Co., Westport, Conn., 1980, 2d ed.).
S. A. Matz, *Cookie and Cracker Technology*, pp. 199–253 (AVI Publ. Co., Westport, Conn., 1968).
"Paselli SA2; The Natural Alternative to Fats and Oils", a product bulletin of AVEBE b.a., Foxhol, Holland, Ref. No. 05.12.31.167 EF (Jun. 1988).
B. L. Zoumas and E. J. Finnegan, "Chocolate and Cocoa", *Encyclopedia of Chemical Technology*, vol. 6, pp. 1–19 (Kirk–Othmer, eds., John Wiley & Sons, Inc., New York, N.Y., 3d ed., 1979).

*Primary Examiner*—R. B. Penland
*Attorney, Agent, or Firm*—J. Daniel Wood

[57] ABSTRACT

Chocolate-flavored morsels essentially free of fat and a method for their preparation are provided. The morsels are manufactured by first preparing a mixture comprised of a major amount by weight of an aqueous syrup comprised of a crystallizable saccharide, said aqueous syrup being supersaturated with respect to said crystallizable saccharide, a minor amount by weight of defatted cocoa powder, a minor amount by weight of said crystallizable saccharide in crystalline form, and a minor amount by weight of an instant starch having a cold-water solubility of greater than 50 weight percent (and preferably a fat content of less than 0.25 weight percent), the amount of water in said aqueous syrup being insufficient to dissolve a major portion of said minor amount of instant starch. The morsels are then prepared by dividing said mixture into separate portions and forming said portions into discrete morsels in an environment which allows crystallizable saccharide to crystallize from said syrup onto said crystallizable saccharide in crystalline form. The chocolate-flavored morsels can be used in baked goods, particularly in cookies, to provide a chocolate-flavored morsel as a flavoring ingredient without adding fat to the baked good.

16 Claims, No Drawings

CHOCOLATE-FLAVORED CONFECTIONS AND METHOD FOR MANUFACTURING

FIELD OF THE INVENTION

This invention relates to a method useful in the manufacture of confections having a chocolate flavor and to chocolate-flavored confections useful in the preparation of baked goods.

BACKGROUND OF THE INVENTION

Processes and recipes for various confections, including chocolate and other confections, are disclosed and discussed by B. W. Minifie, *Chocolate, Cocoa and Confectionery: Science and Technology*, pp. 28–141, (AVI Publ. Co., Westport, Conn., 1980, 2d ed.). The passage at pages 128 to 141 discusses chocolate coatings, made with partial substitution of a vegetable fat for the cocoa butter, and dietetic chocolates, made by replacing sweeteners with low or non-caloric substitutes or by incorporating ingredients low in fat and carbohydrate, e.g. soy protein or carboxymethyl cellulose.

U.S. Pat. No. 3,184,315 (Wolf) discloses chocolate flavored confections to be used in frozen foods such as ice cream, frozen cake batters and doughs, and the like. It is disclosed that the confection is made from cocoa and sugar and that it has sufficiently low fat and moisture content to avoid being brittle at low temperatures. It is disclosed that when cocoa is employed without added chocolate liquor, a small amount of a fat, e.g. cocoa butter, natural fat or hydrogenated vegetable oil, is added.

SUMMARY OF THE INVENTION

This invention relates to a method of preparing a chocolate-flavored confection comprising:

preparing a mixture consisting essentially of a major amount by weight of an aqueous syrup comprised of a crystallizable saccharide, said aqueous syrup being supersaturated with respect to said crystallizable saccharide, a minor amount by weight of defatted cocoa powder, a minor amount by weight of said crystallizable saccharide in crystalline form, and a minor amount by weight of an instant starch having a cold-water solubility of greater than 50 weight percent, the amount of water in said aqueous syrup being insufficient to dissolve a major portion of said minor amount of instant starch, and dividing said mixture into separate portions and forming said portions into discrete morsels in an environment which allows crystallizable saccharide to crystallize from said syrup onto said crystallizable saccharide in crystalline form.

This invention also relates to chocolate-flavored morsels consisting essentially of a major amount by weight of a crystallizable saccharide, at least a portion of said crystallizable saccharide being in crystalline form, a minor amount by weight of defatted cocoa, a minor amount by weight of an instant starch having a cold-water solubility of greater than 50 weight percent, and a minor amount of water, the amount of water in said morsels being insufficient to dissolve a major portion of said amount of instant starch. The morsels are essentially free of fats and/or oils and so are especially useful for inclusion in low or reduced fat foods.

This invention also relates to baked goods comprising a continuous carbohydrate matrix and chocolate-flavored morsels as described above in association with and in fixed relation to said continuous carbohydrate matrix and to a method of making such a baked good comprising baking a dough or batter comprising a major amount of a carbohydrate component and a minor amount of chocolate-flavored morsels as described above.

This invention also relates to a blend composition useful in preparing baked goods comprising a major amount by weight of a carbohydrate component and a minor amount by weight of chocolate-flavored morsels as described above. The blend composition may be a dry mix containing said carbohydrate component and morsels or a dough or batter containing said carbohydrate component and morsels.

This invention also relates to a candy piece comprising a confectionery shell surrounding a core comprised of a chocolate-flavored morsel as described above. Such confections are prepared by sugar panning a plurality of such morsels to coat such morsels with a confectionery shell. The core of the piece mimics the mouthfeel of true chocolate, but is essentially fat-free (e.g. contains less than about 0.5% by weight fat).

As used herein, the term "a major amount" shall mean at least about 50% by weight and the term "a minor amount" shall mean less than about 50% by weight.

DETAILED DESCRIPTION OF THE INVENTION

The first step in preparing a chocolate-flavored confection of this invention is obtaining a high solids syrup comprised of a crystallizable saccharide. By "crystallizable saccharide" is meant a sugar or sugar alcohol that is susceptible to crystallization from a concentrated aqueous syrup. Dextrose and sucrose are examples of suitable sugars. Examples of sugar alcohols include sorbitol, mannitol, and xylitol. The use of sucrose or, especially, dextrose as the crystallizable saccharide is preferred. Because dextrose is especially preferred, the following description will focus on the use thereof.

Dextrose is available commercially in the anhydrous or monohydrate crystalline form, or as a syrup, including syrups containing a mixture of dextrose and another material, e.g. high fructose corn syrup and 64 D.E. corn syrup. Dextrose is generally obtained by the hydrolysis of starch, e.g. from corn. The production and properties of dextrose and corn syrups are discussed by H. M. Pancoast et al., *Handbook of Sugars*, pp. 157–287 (AVI Publ. Co., Westport, Conn., 2d ed., 1980), the disclosure of which is incorporated by reference herein. Substantially pure dextrose, as crystalline monohydrate or high solids syrup (e.g. about 70% by weight) are preferred for use herein. Corn syrups are characterized by dextrose equivalent (D.E.) with the high conversion syrups having a high D.E. and a high concentration of dextrose. Lower conversion syrups may be useful, but are not preferred. Corn syrups are typically an inexpensive source of dextrose and thus may be a preferred source of dextrose for this reason.

The aqueous syrup may also contain saccharides which are relatively resistant to crystallization, e.g. fructose. The fructose may be derived from crystalline fructose, a high fructose corn syrup, or an invert syrup. Crystalline fructose is also an item of commerce, but has historically been much less plentiful than dextrose and corn syrups. The crystallization of fructose is disclosed in U.S. Pat. Nos. 3,883,365 (Forsberg et al.), 3,928,062

(Yamauchi), 4,199,374 (Dwivedi et al.), and 4,643,773 (Day). Crystalline fructose is distinguished from materials containing significant amounts of amorphous fructose or corn syrup by-products, e.g. the semi-crystalline fructose disclosed in U.S. Pat. No. 4,517,021 (Schollmeier). Crystalline fructose is available commercially at a purity in excess of 99.0% as the anhydrous crystalline form of beta-D-fructose, for example KRYSTAR® brand crystalline fructose available from A. E. Staley Manufacturing Company, Decatur, Ill.

The dextrose (and fructose) may also be obtained by the use of high fructose corn syrup or an invert syrup. By "high fructose corn syrup" (HFCS) is meant a corn syrup containing at least about 40% fructose by weight of dry solids (d.s.), typically from about 40% to about 60% (e.g. the two most common HFCS are at a nominal 42% or 55% d.s. fructose). High fructose corn syrups are items of commerce as disclosed by H. M. Pancoast et al., *Handbook of Sugars*, pp. 176–177 and 232–233. The Type A high fructose corn syrup referred to therein and having 42% d.s. fructose is the product of enzymatic isomerization of a glucose syrup that generally has from 5–8% higher saccharides (e.g. di-saccharides, tri-saccharides, and so on). The Type B high fructose syrup contains 55% d.s. fructose and is typically obtained by chromatographic fractionation of a Type A syrup, but can be obtained by other means of fructose enrichment of a Type A syrup (e.g. crystallization of dextrose from a Type A syrup). Invert syrup is obtained by the "inversion", i.e. hydrolysis of sucrose.

The dextrose (and, optionally, fructose) are used to prepare a syrup that is supersaturated with respect to dextrose. The water used to prepare the syrup can be from any potable source or can be supplied by one of the sweetener syrups described above. Dry or liquid sweeteners can be combined in any order. Crystalline fructose and crystalline dextrose can be mixed with a syrup separately or premixed together before mixing with the syrup. The precise ratio of dextrose to fructose may vary widely depending upon the precise characteristics desired in the resulting product, but there will generally be a major amount by weight (e.g. more than 50% d.s.b.) of dextrose and, if any, a minor amount by weight (e.g. less than 50% by weight d.s.b.) of fructose, e.g. a ratio of dextrose to fructose of from about 1.5:1 to about 2.5:1.

The precise amount of water in the syrup may vary and will depend, at least in part, upon the amounts of the sugars and sugar alcohols present because such materials tend to inhibit the hydration and gelatinization of the granular starch component and upon the ratios of the sugars because sucrose tends to have a greater inhibitory effect than dextrose, which in turn has a greater inhibitory effect than fructose. Typically, however, the water in the syrup will be present in a range from about 5% to about 20% by weight, preferably from about 10% to 15% by weight of the total ingredients of the morsel. If processing of the syrup will involve vaporization of a significant amount of the water, such vaporization should be taken into account in choosing the initial water content of the syrup. It should be noted that it may be necessary or desirable to heat the syrup ingredients to form a supersaturated syrup, but that the syrup should be cooled back to near ambient temperatures (e.g. 80° F.) if necessary to avoid hydration of the instant starch.

The supersaturated syrup is seeded with dextrose crystals to initiate the crystallization of dextrose and thus form microcrystals of dextrose dispersed in a liquid phase. The precise particle size of the dextrose seed will vary depending upon the texture desired in the resulting confection, but will generally range from about 50 to about 100 micrometers. The seed will typically comprise from about 15% to about 35% by weight of the morsel. The seeding will be accomplished by mixing the seed with the syrup by means which obtain a substantially homogeneous dispersion of the dextrose seed throughout the syrup.

A critical component of the composition is an instant starch having a cold-water solubility greater than about 50% by weight. An instant starch is characterized in that it is capable of hydrating in room temperature water. There are two types of instant starches: pre-cooked starches (e.g. by drum drying a cooked slurry or spray cooking a slurry of native starch) and cold-water swelling granular starches. An example of a suitable pre-cooked starch is a pre-gelatinized tapioca starch, available from the A. E. Staley Manufacturing Company as REDISOL® 88.

Cold-water swelling starches are, however, particularly preferred, especially those that are non-birefringent having a fat content of less than 0.25% by weight, e.g. MIRA-GEL® brand cold-water swelling starch from the A. E. Staley Manufacturing Company. The preparation of such starches is described in U.S. Pat. No. 4,465,702 (Eastman et al.), the disclosure of which is incorporated by reference. This starch is distinguished from pregelatinized starch in that most of the granules are still intact despite the ability of the starch to swell and then gel in cold water, e.g. water at room temperature. The starch is also characterized as unmodified, i.e. having little or no chemical modification that impairs the ability of the starch to form a gel. The ability of the granular starch to swell and then form a gel in cold water can be visually observed, e.g. with a microscope, and can be quantified by measuring the viscosity of an aqueous dispersion of the starch. The ability of the starch to swell in cold water can generally be correlated to the cold-water solubility of the starch. Thus, cold-water solubility can generally be used as a measure of cold-water "swellability". Cold-water solubility is conveniently determined by mixing a known weight of starch in a measured volume of distilled water at room temperature with a Waring blender, centrifuging the starch suspension and weighing the residue obtained by evaporation of a measured aliquot of the supernatant liquid. The cold-water solubility of the sample is expressed as % solubles, dry solids basis (dsb). The precise means of determining cold-water solubility is described in Example 1 of U.S. Pat. No. 4,465,702.

The treatment of the starch to increase its ability to swell in cold water (hereinafter referred to as "conversion") is generally accomplished by contacting the granular starch with an aqueous alcohol, said contacting occurring for a time and at a temperature sufficient to achieve the desired degree of conversion. In general, substantially complete conversion is desired and, thus, the following description will be largely devoted to techniques which can be used to accomplish the same.

In the preferred process, a native granular starch is first slurried in a liquid medium comprised of water and an alcohol selected from ethanol, n-propanol and iso-propanol and then heated under pressure above the boiling point of the slurry for a time sufficient to achieve the desired degree of conversion, but insufficient to otherwise degrade the granular starch.

In specific, preferred processes, the first step in carrying out the process is the preparation of a slurry comprised of about 10 to about 25 parts by weight dry substance basis (dsb) of a granular corn starch in a liquid medium comprised of about 50 to about 75 parts by weight of an alcohol selected from ethanol, denatured ethanol, propanol and isopropanol and about 13 to about 30 parts by weight of water, provided that the liquid medium for the slurry contains about 15% to about 35% by weight of water inclusive of the water in the starch (i.e. the weight ratio of alcohol to water is about 5.7:1 to 1.9:1). Preferably, the slurry is comprised of about 12% to about 20% by weight of starch (dsb) and about 17% to about 30% water.

The above slurry of granular corn starch in an aqueous alcohol medium is heated to a temperature of about 300° to about 360° F. under autogenic pressure for about 1 to about 30 minutes. The heating process can be conducted as a batch process in a sealed vessel or as a continuous or semi-continuous process by passing the slurry through a residence time for the slurry in the heated zone of about 1 to 30 minutes. Preferably, the starch slurry is heated to a temperature of about 315° to about 350° F. for a period of about 1 to about 10 minutes to convert the ungelatinized corn starch to the present cold-water swelling starch having high cold-water solubility. In a most preferred process, the ungelatinized corn starch slurry contains about 12% to about 20% by weight of starch (dsb) and the liquid medium for the slurry contains about 18% to about 26% by weight of water (i.e. the weight ratio of alcohol to water is about 4.6:1 to 2.8:1); conversion of the ungelatinized corn starch to the present cold-water swelling/soluble starch is accomplished by heating the slurry to a temperature of about 325° to about 340° F. for a period of about 2 to about 5 minutes.

After the heating step, the slurry can be cooled to below about 120° F., and the product cold-water swelling granular starch is separated from the liquid medium component of the slurry by filtration or centrifugation. Following the recovery of the starch product from the reaction slurry, the starch can be washed with 1 or more volumes of the alcohol used in the process, and dried and/or desolventized by conventional methods. For example, the starch can be dried in an oven to a certain volatiles level and then contacted with a hot humid gas, preferably moist air or steam, while the starch is maintained at a temperature from about 100° to about 250° F. for a time sufficient to reduce the alcohol content of the starch to the desired level.

It is important that the instant starch is not exposed to the syrup under conditions that will cause the instant starch to hydrate. Generally, the syrup mixture should be at an ambient temperature (e.g. 70° F. to 90° F.) upon admixture with the instant starch. The precise temperature will depend upon the solids content of the syrup and the susceptibility to hydration of the chosen instant starch.

The morsel will be comprised of a major amount by weight of sugars and/or sugar alcohols. The precise amount of the sugars (total of the syrup and the seed) will vary but will typically be greater than about 65%, preferably from about 75% to about 85% by weight. The amount of the instant starch as a percentage of the total weight of the morsel ingredients may vary, but will typically range from about 5% to about 15% by weight of the morsel ingredients.

The morsel will also contain defatted cocoa as a flavoring ingredient. The production of cocoa powder is described in Minifie, supra, at pages 28–66, the disclosure of which is incorporated by reference. The cocoa used in this invention can be processed from either natural or "Dutched" chocolate from which a substantial portion of the fat or cocoa butter has been expressed or removed by solvent extraction, by pressing, or by other means known to those skilled in the art. Cocoa suitable for use in the practice of this invention preferably contains less than about 10% fatty constituents, more preferably less than about 5%, and most preferably less than about 1%. Thus, it is preferred that the cocoa be essentially fat-free.

The amount of cocoa used will generally be a minor amount, typically from about 1% to about 10% by weight of the morsel ingredients. The precise amount used will depend upon the level of flavor desired and the particular cocoa chosen. For example, Dutched chocolate is prepared by treating cocoa nibs with an alkali material, such as potassium carbonate, in a manner well known in the art. Generally, it tends to have a darker color and also can be more flavorful than natural cocoas, and thus less will be needed to obtain a desired level of flavor.

After seeding and incorporation of any other functional ingredients, the dispersion is ready to be formed into morsels. The dispersion can be deposited into a plurality of molds where it is allowed to firm or set. In molding, the bulk mixture, still in a flowable state, is divided among a number of molds. The molds can be of any construction suitable for the intended purpose. Starch molds can be employed. Starch molds are formed by making a plurality of depressions of the desired shape in a bed of starch.

After forming, the composition will be stored for a limited time under environmental conditions, e.g. temperature and humidity, that allow completion of crystallization to the extent desired. The time required for completion of crystallization will depend upon the particular formulation chosen, but will generally be from about 10 minutes to about 24 hours. The temperature of the mixture during the crystallization period may vary, but will generally be close to ambient temperature to allow crystallization to proceed to the desired degree. In confections at high dry solids and with moderate dextrose levels, it may be desirable to heat the seeded mixture to obtain the desired crystallization.

The morsels can be coated with a confectionery shell to form a candy. The application of confectionery coatings is described in Minifie, supra, at pages 450–454, the disclosure of which is incorporated by reference. In general, the morsels will be introduced into a rotating pan along with a syrup comprised of a crystallizable sugar or sugar alcohol, as described above. The syrup will coat the morsels, and, when dried, will form a shell surrounding the morsels as a confectionery coating.

An especially advantageous use of the morsels of this invention is in the production of baked goods containing such morsels. The instant starch tends to substantially inhibit, and will preferably essentially prevent, melt away and loss of morsel integrity during baking. By "baked goods" is meant those goods which are fried, e.g. doughnuts, shell pastries, pancakes, and the like, as well oven baked goods such as cakes, cookies, and brownies. Baked goods generally are comprised of a continuous carbohydrate matrix that is typically comprised of flours and/or starches, most commonly in admixture with one or more sugars. Bulking agents such as maltodextrins and/or polydextrose can be used to replace at least a portion of the flour, starches and/or sugars that are typically used. Various other functional ingredients, e.g. flavors, colors, fruits, nuts, shortening, emulsifiers, etc., are typically dispersed within or upon the matrix. The typical components of the baked products will be discussed in more detail below.

Flour provides a major component in the bakery products of the present invention. The flour may be any finely comminuted meal of any cereal grain or edible seed, or mixtures thereof, as are known by one skilled in the art of baking. Typical non-limiting examples include wheat flour, barley flour, rye flour, cornstarch and corn flour, triticale, and also the so-called synthetic flours, which incorporate such materials as starch and soy protein isolate, with or without heat and/or steam treatment. The wheat flours are most typically employed in baking. They consist of several types, including hard red spring, hard red winter, soft red winter and white winter and spring. They are distinguished by differences in gluten quality, water absorption and protein content. Protein in these flours can vary from about 7% to about 14%, with the soft wheat flours having protein contents at the lower end of that range and hard winter wheat flours having protein contents at the upper end of that range.

The amount of protein in a baked good influences its texture and tenderness. The primary source for protein in baking is egg. However, since flour also contains some protein, the type of flour used in baking can influence the final product's texture somewhat. The higher the protein content in a flour, the tougher texture a product baked with that flour will have.

Another major component of many baked goods, particularly cookies and cakes, is a sweetener. Carbohydrate sweeteners such as sucrose, fructose, dextrose, and the like are commonly used. The sweetener may be a mixture of two or more sweeteners and may be a syrup, e.g. invert syrup or high fructose corn syrup.

Emulsifiers are typically added to a dough or batter used to prepare a baked goods. Preferably, from about 0.1% to about 10% of an emulsifier will be added to the dough or batter. Suitable emulsifiers include, but are not limited to, lactylated mono- and diglycerides, propylene glycol monoesters, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Polyglycerol esters suitable for use as emulsifiers typically have an average of from 2 to 10 glycerol units and from 1 to 3 fatty acyl groups of from 14 to 18 carbon atoms per glycerol moiety.

Shortening, in the form of oil or a higher melting fat, is commonly included in baked goods. The amount of shortening in many baked goods is from about 10% to about 25%. In preferred embodiments of this invention, however, the baked goods will have reduced levels of fat compared to conventional baked goods and will most preferably be essentially fat-free. However, the inclusion of at least a small amount of shortening may be desirable. The shortenings that can be employed are well known by one skilled in the art of baking and include solid or plastic, as well as liquid or semi-fluid, glyceride shortenings derived from animal, vegetable fats and oils, including synthetically prepared shortenings. These glycerides can contain saturated and unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like and are generally obtained from edible oils and fats such as corn oil, cottonseed oil, soybean oil, coconut oil, rapeseed oil, peanut oil, olive oil, palm oil, palm kernel oil, sunflower seed oil, wallflower oil, lard, tallow and the like. These glycerides can also contain, in part, one or two short-chain acyl groups having from 2 to about 6 carbon atoms such as acetyl, propanol, valeryl, and caproyl; they can be prepared by random or low-temperature interesterification reactions of fatty triglyceride containing oils and fats such as interesterified or rearranged cottonseed oil and lard; and they can be otherwise formed by various organic syntheses.

Some typical shortenings are soybean-based shortenings or oils, hydrogenated soybean-based shortening or oil, corn oil, palm oil, hydrogenated palm oil, lard and tallow oils. Of these, "Crisco" brand shortening or oil, which is soybean-based, is preferred. "Crisco" oil or shortening is commercially available from The Proctor & Gamble Company.

Eggs may be used in making the baked products of the present invention. Eggs impart flavor, richness and color to the baked goods. On the average, an egg contains about 73% water and about 27% egg solids. The egg solids comprise about 48% protein, about 44% fat, and about 8% minor materials. Alternatively, egg solids, particularly egg albumen and dried yolk, may be used in baking the products disclosed herein. Soy isolates, whey protein concentrates, or other egg substitutes may also be used herein in combination with, or in place of the egg solids. Such substitutes are well known to those skilled in the art of baking. From 0% to about 6%, preferably from about 0.1% to about 6%, on a dry solids basis, of the formulation for the baked products should comprise egg or egg substitute.

Chemical leavening agents can also be added to the baked goods to provide aeration to the final product. Examples include a baking soda, e.g. sodium, potassium, or ammonium bicarbonate, alone or in combination with a baking acid, preferably sodium aluminum phosphate, monocalcium phosphate, dicalcium phosphate or mixtures thereof. The selection of the leavening system is within the knowledge of one skilled in the art. From 0% to about 2%, preferably from about 0.1% to about 2%, of the formulation for the products of the present invention will typically be leavening agent.

Additional components can be added to the batter or dough of the present invention prior to baking to provide a wide variety of snack products. Additives may be of a type that remain as whole pieces in the snack product. Such additives include, but are not limited to, fruit or fruit-flavored bits, such as blueberry, strawberry, or citrus flavored bits, other fruit-flavored bits, such as cherry, blackberry, apricot, raisin, date, or apple; cereals, such as bran or oatmeal; and nutmeats, including walnuts, black walnuts, hickory nuts, hazel nuts, Brazil nuts, peanuts, macadamia nuts, pecans, almonds, cashews, coconut and the like. From 0% up to about 40% of the final baked product of the present invention can be such additive.

Other components of a type that are blended into the dough or batter prior to baking may be incorporated to add flavor, aroma, and color to the final baked product.

For example, peanut butter; spices, such as cinnamon, mace, nutmeg, caraway, anise, allspice, poppy seed, coriander, ginger, cloves, fennel, and salt; and flavorings, such as banana, orange, lemon, mint or vanilla. Honey or molasses may also be used in the present invention but the levels of the individual sugars in the saccharide mixture must be altered to account for the sugars in the molasses or honey. Mixtures of these flavorings and whole piece components can be added to provide a variety of desirable products. Up to about 25% of the final baked product of the present invention can be comprised of such additives. The exact amount added for any of these flavoring components (whether they are of the type that is blended into the composition or the type that remain as whole pieces) will depend on personal preference and on what particularly is being added.

The basic components and the optional components that make up the baked goods of the present invention can be combined in a number of slightly different ways to yield different types of baked goods. Obviously, the amount and type of flavorings, spices, or whole piece components, such as fruit pieces, nuts, etc., can be manipulated to vary the products. Different icings or streusel toppings can also be added for variation. Additionally, the texture of these products can be altered to yield different types of product. This is done through the manipulation of the total protein content in the composition of the baked good. It is the protein content that gives a baked product its structure. Two important sources of protein are found in baked goods, protein in the flour, and protein in the egg (or egg substitute). A brownie or cookie, which tends to be a denser product, contains a limited amount of protein. A snack cake or muffin is characterized by a lighter, airier structure. Additional protein must be added to create a product with this type of texture. The preferred source for this added protein is egg white. Other acceptable sources of protein that will give the product this lighter, airier texture include, but are not limited to, non-fat milk solids, casein, sodium caseinate, calcium caseinate, modified casein, sweet diary whey, modified whey, and whey protein concentrate. For each product, the components can be combined with, for example, any planetary bowl mixer, ribbon blender, or other conventional mixer.

One aspect of the present invention is a culinary premix product for which the consumer completes preparation. Accordingly, the dry blend, or the individual components thereof, can be mixed with a finely divided carbohydrate component, e.g. all-purpose flour, to form a dry mix useful in preparing baked goods. The components of the dry blend will generally comprise only a minor portion of the chocolate-flavored morsels. Such a premix could be made by combining only morsels of the present invention and the other dry ingredients of the culinary premix. The consumer can then add a specified amount of shortening or oil, water, and eggs, and bake the resulting batter to form the desired product. Such a form of premix would be especially suitable for sale to a consumer for baking in the home.

A culinary premix more suitable for sale to a commercial baker would also include dry egg solids in the mix so that the baker would only need to add water to form the batter for baking. The premix also comprises from about 10% to about 25% of a shortening component, from 0% to about 6%, preferably from about 0.1% to about 6%, on a dry solids basis, of an egg component and from 0% to about 2%, preferably from about 0.1% to about 2%, of a leavening agent.

Packaging of the dry premix product in a sealed plastic film is sufficient. Since the water activity of the dry mix is essentially nil, i.e. from about 0.2 to about 0.4, there is little concern about microbiological growth with extended storage periods. Packaging must be done using generally accepted good manufacturing practices for foodstuffs.

The components described above can be formulated in several slightly different ways to yield various types of baked goods, including but not limited to, brownies, snack cakes, muffins, and cookies, all of which are within the scope of the present invention. The batter or dough of the desired snack product can be baked using radiant, conductive or convective exposure to energy of a type which imparts thermal energy to the product being baked such as conventional, convection, microwave oven baking or combinations thereof. Baking times and temperatures are dependent on the type of oven used and the type of product being baked. The products may be baked in batch or continuous ovens.

A particularly advantageous use of the morsels of this invention is in the production of "chocolate-chip" cookies. Such cookies are among the most popular with consumers, if not the most popular. The use of these morsels will allow for the production of chocolate-chip cookies that are essentially fat-free. The production of cookies, particularly by mechanized methods, is described extensively by S. A. Matz, *Cookie and Cracker Technology*, (AVI Publ. Co., Westport, Conn., 1968), the disclosure of which is incorporated herein by reference.

The morsels of the present invention are suitable for use with certain storage-stable, dual-textured cookies. The "laminated" version of these cookies are disclosed in U.S. Pat. No. 4,455,333 to Hong et al., issued Jun. 19, 1984, which is incorporated by reference. The laminated cookies of Hong et al. combine different doughs to produce a cookie having storage-stable, crisp and chewy textures. This is accomplished by distributing through the crumb-continuous matrix discrete regions of crumb containing readily crystallizable sugar and discrete regions of crumb containing a crystallization-resistant sugar. The result is a storage-stable plurality of textures, the regions containing crystallized sugar providing a crisp texture and the regions containing uncrystallized sugar providing a chewy texture.

In addition, U.S. Pat. No. 4,503,080 to Brabbs et al., issued Mar. 5, 1985, (herein incorporated by reference) discloses a similar storage-stable dual-textured cookie where the discrete regions of crisp texture contain a readily crystallizable sugar and the discrete regions of chewy texture contain a readily crystallizable sugar, plus a polyol crystallization inhibitor. U.S. Pat. No. 4,344,969 to Youngquist et al., issued Aug. 17, 1982, (herein incorporated by reference) discloses yet another method for preparing such cookies from a single-dough where sugar crystallization is controlled by enzyme activity. Manipulation of water activity is one means used for activating and inactivating the enzymes of selected portions of the cookie. Thus, sugar and/or starches in the areas where the enzyme is active are converted into mixtures which are non-crystallizing, or crystallization-resistant, while the crystallization behavior of sucrose is preserved in those areas where the enzyme is inactive. The resulting dough and subsequent crumb areas of the baked cookie have storage-stable, crisp and chew textures, respectively.

The crumb-continuous matrix of these dual-textured cookies (and the inclusion of chocolate flavored morsels according to the present invention within this matrix), can be achieved by using any of the methods disclosed in the above Hong et al., Brabbs et al., and Youngquist et al. patents. The preferred cookie and cookie dough products are made by the process of preparing a first cookie dough from typical cookie ingredients containing a crystallization-resistant sugar or a sucrose or solution thereof optionally, an effective amount of a sugar crystallization inhibitor for the sucrose, preparing a second cookie dough containing a sucrose or solution thereof, and substantially enveloping the first dough with a layer of the second dough, thereby forming a ready-to-bake, laminated dough structure which is then baked to yield a dual-textured cookie.

Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the sugar/flour/water/shortening ratio. In general, any cookie recipe which produces an organoleptically acceptable crumb-continuous cookie (as opposed to filled and sandwich-type cookies) can be used.

After baking, this crumb-continuous matrix preferably has a final water activity, $a_w$, of from about 0.25 to about 0.8, most preferably from about 0.45 to about 0.60. Cookie baking time typically ranges from about 5 minutes to about 15 minutes, depending on the number of cookies being baked, the size and shape of the cookie, the cookie ingredients, oven temperature, and like factors. The baking process can be conducted according to the methods described in the above patents. Baking can either be performed in the batch mode, as typically done in the home, or in a continuous fashion, as is often done in commercial bakeries.

To realize a maximum shelf life for any of the final baked products prepared according to the present invention, packaging which allows no moisture to pass from the snack product to the environment or vice versa is desirable. A product packaged in this way would not be degraded at all whether stored in conditions of low or high humidity. Packaging which allows for microwave heating of the product prior to eating, such packaging at the same time being moisture tight, would be most desirable. The packaging should be done using generally accepted good manufacturing practices.

The following examples will illustrate the invention, but should not be construed to limit the scope thereof unless otherwise expressly noted. All parts, percentages and ratios set forth herein are by weight unless otherwise noted in context.

EXAMPLES

Example 1

Chocolate-Flavored Morsels

Chocolate-flavored morsels were prepared as follows.

| Ingredients | Parts by Wt. |
|---|---|
| ISOSWEET ® 180 high fructose corn syrup (42% fructose, d.s.b. and 80% d.s., A. E. Staley Manufacturing Company) | 1,152 |
| STALEYDEX ® 111 crystalline dextrose (A. E. Staley Manufacturing Company) | 532 |
| KRYSTAR ® 300 crystalline fructose (A. E. Staley Manufacturing Company) | 80 |
| Cold-water soluble granular starch (MIRA-GEL ® 463, A. E. Staley Manufacturing Company) | 200 |
| Defatted cocoa powder (99% fat free, Shoemaker, Inc., Newtown, PA) | 60 |

Procedure
1. Cold mix (70°–80° F.) the sweeteners first, then add the starch and cocoa.
2. Deposit into small button shapes in dry (5%) moulding starch.
3. Allow to remain in starch overnight (without any heat or forced drying).
4. Demould after overnight and clean with brushing and air.

Example 2

Cookie with Chocolate-Flavored Morsels

Cookies were prepared with the chocolate-flavored morsels of Example 1 as follows.

| Ingredients | Amounts |
|---|---|
| All-purpose flour | 2¼ cups |
| Baking soda | 1 teaspoon |
| Salt | 1 teaspoon |
| Butter, softened | 1 cup (2 sticks) |
| Sugar | ¾ cup |
| Brown sugar, firmly packed | ¾ cup |
| Vanilla extract | 1 teaspoon |
| Eggs, whole | 2 |
| Chocolate-flavored morsels | 2 cups |

Procedure
1. Preheat oven to 350° F.
2. In small bowl, combine flour, baking soda and salt. Set aside
3. In a large mixer bowl, beat butter, sugar, brown sugar and vanilla extract until creamy.
4. Beat in eggs.
5. Gradually add flour mixture.
6. Stir in chocolate morsels.
7. Drop by rounded measuring spoonfuls onto ungreased cookie sheets.
8. Bake 12–14 minutes at 350° F.

Example 3

Lower Fat Chocolate Chip Cookies

A lower fat chocolate chip cookie can be prepared using the morsels of Example 1 as follows.

| Ingredients | Parts by Wt. |
|---|---|
| Flour, all purpose | 24.6 |
| Chocolate-flavored morsels | 24.6 |
| CREAMTEX (partially hydrogenated soybean and cottonseed oil from Durkee) | 4.1 |
| Brown sugar | 12.3 |
| Granulated sugar | 12.3 |
| Eggs, whole, fresh | 8.2 |
| Salt, iodized | 0.5 |
| Baking soda | 0.5 |

-continued

| Ingredients | Parts by Wt. |
| --- | --- |
| Vanilla extract | 0.5 |
| Water | 9.3 |
| Enzyme-converted potato starch (PASELLI SA2, Avebe b.a.) | 3.1 |

Procedure
1. Cream salt, soda, and CREAMTEX with a mixer at medium speed.
2. Add eggs (and water, where applicable); mix well.
3. Mix in all remaining ingredients, including chocolate-flavored morsels.
4. Form balls with 20 g of batter. Flatten on a baking sheet to approximately 4×4 cm.
5. If too moist to roll into a ball, drop by teaspoon.
6. Bake at 190° C. (375° F.) for 10 minutes.

What is claimed is:

1. A method of preparing a chocolate-flavored confection comprising:
    preparing a mixture consisting essentially of a major amount by weight of an aqueous syrup of a crystallizable saccharide, said aqueous syrup being supersaturated with respect to said crystallizable saccharide, a minor amount by weight of defatted cocoa powder, a minor amount by weight of said crystallizable saccharide in crystalline form, and a minor amount by weight of an instant starch having a cold-water solubility of greater than 50 weight percent, the amount of water in said aqueous syrup being insufficient to dissolve a major portion of said minor amount of instant starch, and
    dividing said mixture into separate portions and forming said portions into discrete morsels in an environment which allows crystallizable saccharide to crystallize from said syrup onto said crystallizable saccharide in crystalline form wherein said morsels are essentially free of fat.

2. The method of claim 1 wherein said instant starch is a non-birefringent, granular starch.

3. The method of claim 1 wherein said instant starch is a granular starch having a fat content of less than about 0.25% by weight.

4. The method of claim 1 wherein said crystallizable syrup consists essentially of dextrose.

5. The method of claim 1 wherein said minor amount of instant starch is from about 5% to about 15% by weight of said mixture.

6. The method of claim 1 wherein said mixture has a fat content of less than about 0.5% by weight.

7. The method of claim 1 wherein said amount of water in said mixture is from about 5% to about 20% by weight of said mixture.

8. A method of preparing a chocolate-flavored confection comprising:
    preparing a mixture consisting essentially of greater than about 50% by weight of an aqueous syrup of a crystallizable saccharide selected from the group consisting of sucrose and dextrose, said aqueous syrup being supersaturated with respect to said crystallizable saccharide, from about 1% to about 10% by weight of defatted cocoa powder, from about 15% to about 35% by weight of said crystallizable saccharide in crystalline form, and from about 5% to about 15% by weight of a non-birefringent, granular starch having a cold-water solubility of greater than 50 weight percent and a fat content of less than about 0.25% by weight, the amount of water in said aqueous syrup being from about 5% to about 20% by weight of said mixture and being insufficient to dissolve a major portion of said non-birefringent, granular starch, and
    dividing said mixture into separate portions and forming said portions into discrete morsels in an environment which allows crystallizable saccharide to crystallize from said syrup onto said crystallizable saccharide in crystalline form.

9. Chocolate-flavored morsels consisting essentially of a major amount by weight of a crystallizable saccharide, at least a portion of said crystallizable saccharide being in crystalline form, a minor amount by weight of defatted cocoa, a minor amount by weight of an instant starch having a cold-water solubility of greater than 50 weight percent, and a minor amount of water, the amount of water in said morsels being insufficient to dissolve a major portion of said minor amount of instant starch wherein said morsels are essentially free of fat.

10. The morsels of claim 9 wherein said instant starch is a non-birefringent, granular starch.

11. The morsels of claim 9 wherein said instant starch is a granular starch having a fat content of less than about 0.25% by weight.

12. The morsels of claim 9 wherein said crystallizable saccharide consists essentially of dextrose.

13. The morsels of claim 9 wherein said minor amount of instant starch is from about 5% to about 15% by weight of said morsels.

14. The morsels of claim 9 wherein said morsels have a fat content of less than about 0.5% by weight.

15. The morsels of claim 9 wherein said amount of water in said morsels is from about 5% to about 20% by weight of said morsels.

16. Chocolate-flavored morsels consisting essentially of greater than about 50% by weight of a crystallizable saccharide selected from the group consisting of sucrose and dextrose, at least about 15% to about 35% by weight of said crystallizable saccharide being in crystalline form, from about 1% to about 10% by weight of defatted cocoa powder, and from about 5% to about 15% by weight of a non-birefringent, granular starch having a cold-water solubility of greater than 50 weight percent and a fat content of less than about 0.25% by weight, and a minor amount of water, the amount of water in said morsels being insufficient to dissolve a major portion of said non-birefringent, granular starch.

* * * * *